United States Patent [19]

Ochiai et al.

[11] 4,447,177
[45] May 8, 1984

[54] TOOL HOLDER WITH TOOL POSITION COMPENSATING MECHANISM

[75] Inventors: Yoshiki Ochiai, Okazaki; Kenji Nomura, Aichi; Tetsuro Yamakage, Anjo; Toshiharu Takashima, Chiryu, all of Japan

[73] Assignee: Toyoda Koki Kabushiki Kaisha, Kariya, Japan

[21] Appl. No.: 281,781

[22] Filed: Jul. 9, 1981

[30] Foreign Application Priority Data

Jul. 10, 1980 [JP] Japan .............................. 55-97825[U]

[51] Int. Cl.³ ........................ B23B 47/18; B23B 49/00
[52] U.S. Cl. .................................. 408/161; 279/1 TS
[58] Field of Search ............... 408/158, 161, 162, 163; 279/1 TS

[56] References Cited

U.S. PATENT DOCUMENTS 3,740,161 6/1973 Milewski ............................ 408/158

FOREIGN PATENT DOCUMENTS 870486 3/1953 Fed. Rep. of Germany ...... 408/158
54-85492 7/1979 Japan .
380394 8/1973 U.S.S.R. .............................. 408/161

Primary Examiner—Z. R. Bilinsky
Attorney, Agent, or Firm—Oblon, Fisher, Spivak, McClelland & Maier

[57] ABSTRACT

A tool holder incorporating a tool position compensating mechanism is disclosed, which includes a screw shaft axially slidably but non-rotatably supported in a tool mounting shell and formed with a cam surface. A rotary member is rotatably received and threadedly engaged with the screw shaft. A ring shaped internal gear and a reduction gear device including a planet gear are arranged to transmit rotation of a tool spindle to the rotary member at a predetermined reduction gear ratio. When rotated, the rotary member moves the screw shaft in the axial direction which causes adjustment of a tool position in the radial direction by the wedging action of the cam surface.

6 Claims, 2 Drawing Figures

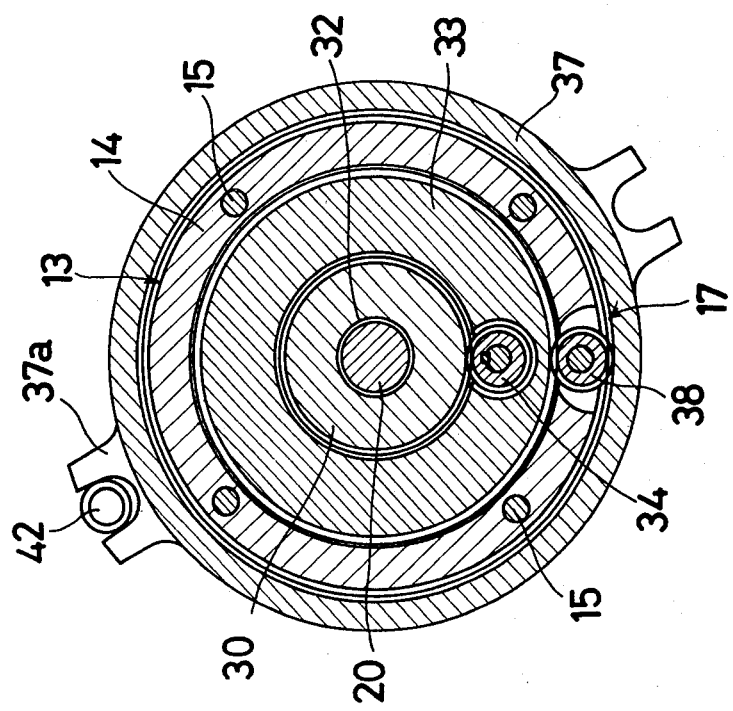

TOOL HOLDER WITH TOOL POSITION COMPENSATING MECHANISM

BACKGROUND OF THE INVENTION

1. Field of the Invention

The present invention relates in general to a tool holder suitable for use on a machine tool with an automatic tool change device, and more particularly to such a tool holder which is capable of automatically adjusting or compensating the radial position of a cutting tool thereon by utilizing the rotation of a tool spindle receiving the tool holder.

2. Description of the Prior Art

Generally, a boring tool holder, as used in a machine tool with an automatic tool change device, incorporates a tool position compensating mechanism therein. This compensating mechanism serves to adjust the position of a cutting tool, carried on the tool holder, in a radial direction thereof by utilizing the rotation of a tool spindle. Such a compensating mechanism utilizes, for example, a thread mechanism to convert rotational movement of the tool holder into axial movement, and a tapered cam mechanism to convert the axial movement into a radial movement which is finally transmitted to the cutting tool. With this type of tool position compensating mechanism, a unit compensating amount of the cutting tool per single rotation of the spindle can be set by pitch of the thread mechanism and the gradient of the tapered cam mechanism. However, since the pitch and the gradient are naturally limited in accuracy, it is extremely difficult to adjust the position of the cutting tool within an accuracy of micron order.

For this reason, utilization of a ratchet mechanism may be considered to transmit the rotation of the spindle a unit angle by a unit angle. However, the ratchet mechanism can transmit the rotation of the spindle only in one direction, so that the position of the tool cannot be freely adjusted depending upon the size of a machined bore. Moreover, when the tool is worn out to be replaced by a new one, the tool holder has to be disadvantageously disassembled to restore the tool position compensating mechanism to its original state.

SUMMARY OF THE INVENTION

It is, therefore, an object of the present invention to provide an improved tool holder with a tool position compensating mechanism which is capable of making fine adjustment of a tool position.

Another object of the present invention is to provide an improved tool holder with a tool position compensating mechanism of the character set forth above wherein a reduction gear mechanism is utilized to transmit rotation of a tool spindle to a rotary member being threadedly engaged with an axially movable screw shaft.

Briefly, according to the present invention, these and other objects are achieved by providing a tool holder for use on a machine tool, as mentioned below. A tool mounting shell is securedly connected to a shank and carries a cutting tool adjustably movable in a radial direction of the mounting shell. The shank is receivable in a tool spindle rotatably supported in a spindle head of the machine tool. A screw shaft is axially slidably but non-rotatably supported in the mounting shell and formed with a cam surface which is sloped along the axis of the mounting shell. A transmitting device is interposed between the cutting tool and the cam surface of the screw shaft for adjustably moving the cutting tool in the radial direction by the wedge action of the cam surface upon axial movement of the screw shaft.

A rotary member is rotatably received and threadedly engaged with the screw shaft. A ring shaped internal gear member is rotatably supported on the external peripheries of the shank and the mounting shell and adapted to be fixed relative to the spindle head for bringing about relative rotation between the internal gear member and the mounting shell when the tool spindle is rotated. A reduction gear device transmits rotation of the mounting shell relative to the internal gear member to the rotary member at a predetermined reduction gear ratio. The reduction gear device includes a rotatable planet gear engaged with the internal gear member.

BRIEF DESCRIPTION OF THE DRAWINGS

Various other objects, features and attendant advantages of the present invention will be more fully appreciated as the same becomes better understood from the following detailed description when considered in connection with the accompanying drawings in which like reference characters designate like or corresponding parts through the several views and wherein:

FIG. 2 is a sectional view taken along the line II—II in FIG. 1.

DETAILED DESCRIPTION OF THE PREFERRED EMBODIMENT

Figure 1:
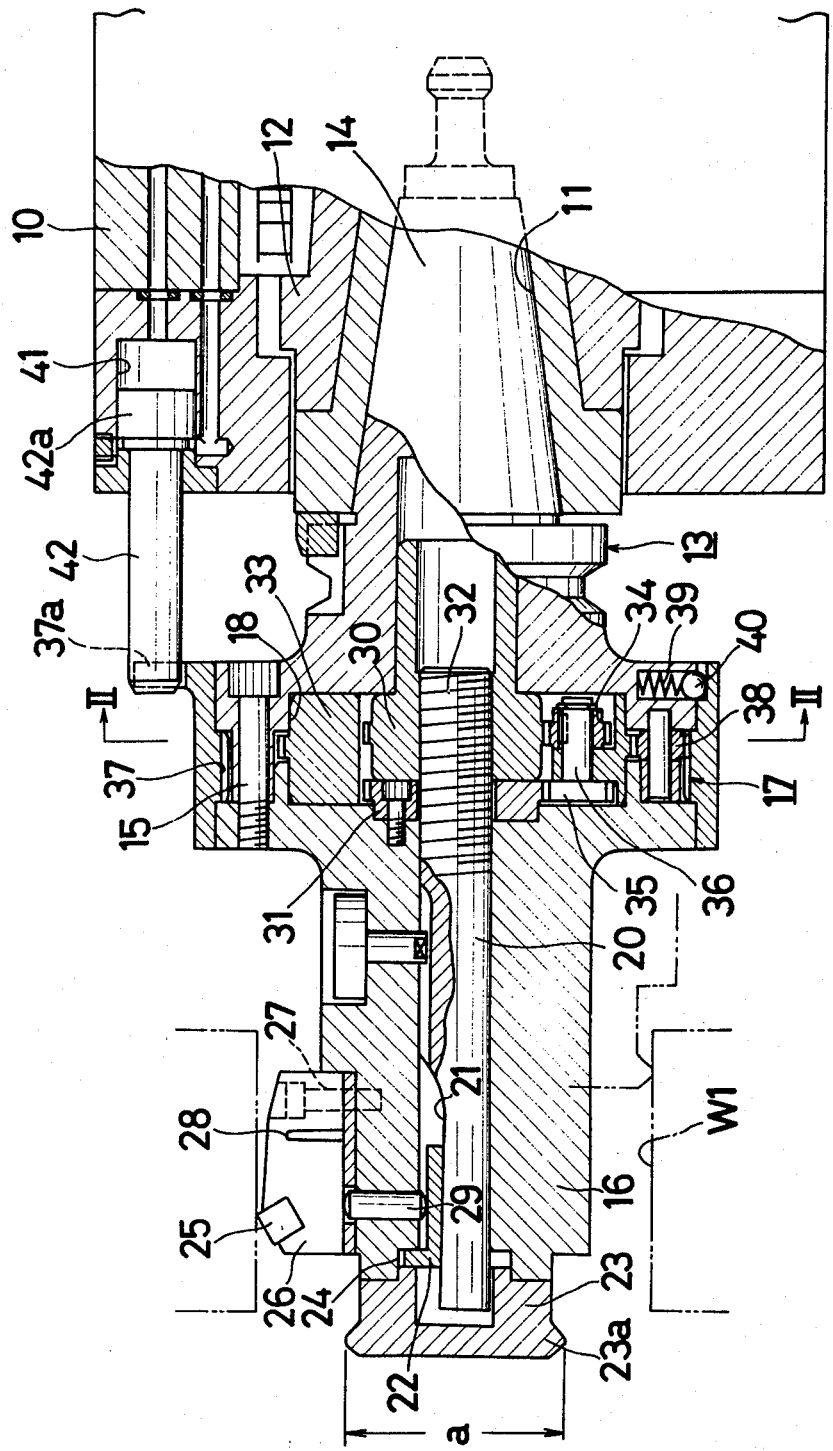
FIG. 1 is a sectional view of a tool holder incorporating a tool position adjusting mechanism according to the present invention.

Referring now to the drawings, and more particularly to FIG. 1, there is shown a spindle head 10 of a numerically controlled machine tool with an automatic tool change function. A tool spindle 12, having a tapered bore 11 at its front end, is rotatably supported in spindle head 10. The tool spindle 12 is rotated by a drive motor (not shown) and is stopped at a predetermined angular position during tool change operation. Furthermore, every rotation of tool spindle 12 is detected by an approximate switch (not shown) during tool position compensating operation. It is to be noted here that the machine tool has the function of measuring a machined bore by utilizing a contact detecting device.

Reference numeral 13 denotes a tool holder to be used in the machine tool and incorporates a tool position compensating mechanism according to the present invention. Tool holder 13 includes a shank 14 to be inserted into tapered bore 11 of tool spindle 12 and a cylindrical tool mounting shell 16 secured to shank 14 in co-axial alignment therewith through bolts 15. At a contact portion between the shank 14 and shell 16, a recess 18 is formed to receive a reduction gear mechanism 17, which is described hereinafter.

A screw shaft 20 is non-rotatably but axially slidably received within shell 16 in co-axial relationship therewith. Screw shaft 20 is formed at the front end thereof with a cam surface 21 which is sloped to ascend as it goes toward the front end of screw shaft 20. A slide piece 22 is slidably engaged on cam surface 21 and is received in a groove 24, formed between shell 16 and a contact detecting head 23 secured to the front end of shell 16 in co-axial alignment therewith for measurement of a machined bore, in such a manner as to be movable only in a radial direction.

Shell 16 is formed at its external front portion with a tool mounting seat, on which one end of a cutting tool 26 having a cutting blade 25 at its other end is fixed by means of a bolt 27. Cutting tool 26 is formed at its mid portion with a slot 28 to facilitate the outward flexing or bending of cutting blade 25. A pin 29 extends through mounting shell 16 in a radial direction thereof, and engages at its one end with slide piece 22 and at its other end with the back of cutting blade 25 of cutting tool 26. Accordingly, when screw shaft 20 is moved in the axial direction, slide piece 22 is moved in the radial direction through wedging action of cam surface 21, whereby cutting tool 26 is flexed or bent in the radial direction through pin 29 to adjust the position of cutting blade 25.

A rotary gear 30 rotatably supported by shank 14 and a stationary gear 31 secured to shell 16 are received in juxtaposed relationship with each other within recess 18 formed at the contact portion between shank 14 and shell 16 and in coaxial alignment with the axis of shank 14. Rotary gear 30 is threadedly engaged with a thread portion 32 formed at the rear end of screw shaft 20. Within recess 18, there is also received a ring-shaped transmission gear 33 which is rotatable about the axis of tool holder 13 and encloses rotary gear 30 and stationary gear 31.

Transmission gear 33 rotatably supports a shaft 36 on which are secured a pair of pinion gears 34 and 35 engaged with rotary gear 30 and stationary gear 31, respectively. It is noted here that the number of teeth of stationary gear 31 and pinion 35 are respectively set to be (N5−1) and (N6+1), where N5 and N6 are tooth numbers of rotary gear 30 and pinion 34, respectively. Accordingly, a reduction gear ratio of the rotary gear 30 to transmission gear 33 is made larger.

A ring-shaped internal gear 37 is rotatably supported on the external peripheries of shank 14 and shell 16. Rotatably supported by shank 14 is a planet gear 38 which is engaged with both internal gear 37 and transmission gear 33. Internal gear 37 is formed with a V-shaped groove into which a steel ball 40 is disposed by means of a compression spring 39 disposed between shank 14 and ball 40. Accordingly, internal gear 37 is normally prevented from rotation relative to shank 14 and shell 16 during cutting operations.

As shown in FIG. 2, internal gear 37 has formed on its external periphery a pair of forked members 37a, one of which is engageable with a piston rod 42 of a piston 42a silidably received in a cylinder 41 formed in spindle head 10. When piston rod 42 is engaged with forked member 37a at the tool position compensating operation, internal gear 37 is fixed relative to spindle head 10 and relative rotation is allowed between internal gear 37 and shank 14.

In operation, in order to perform boring operation, shank 14 of tool holder 13 is inserted by the automatic tool change device into tapered bore 11 of tool spindle 12 after the same is stopped at a predetermined angular position. Subsequently, tool spindle 12 is rotated by the drive motor (not shown) so that cutting tool 26 performs boring operation on a workpiece W1. Upon completion of the boring operation, contact detecting head 23 is moved in the diametrical direction of machined bore W1 to measure the diameter D of machined bore W1. In accordance with measured diameter D of machined bore W1, the wear amount of cutting blade 25 is calculated. When the wear amount of cutting blade 25 exceeds a predetermined value, the tool position compensating operation is performed as follows:

Cylinder 41 is first actuated to advance piston rod 42 into engagement with forked member 37a of internal gear 37 to thereby fix internal gear 37 relative to spindle head 10. Under these conditions, spindle 12 together with tool holder 13 is rotated by the drive motor at low speed. When tool holder 13 is rotated relative to internal gear 37, transmission gear 33 is rotated relative to tool holder 13 through planet gear 38 in the same direction as tool holder 13. Rotation of transmission gear 33 causes pinion gear 35 to rotate about stationary gear 31, whereby rotary gear 30 is rotated relative to tool holder 13 through pinion 34.

Assuming that the tooth numbers of internal gear 37, transmission gear 33, stationary gear 31, pinion gear 35, rotary gear 30 and pinion gear 34 are N1, N2, N3 N5 and N6, respectively, the rotational amount $\theta$ of rotary gear 30 per single rotation of spindle 12 is represented as follows:

$$\theta = N1/N2 \, (N3 \cdot N6/N4 \cdot N5 - 1)$$

Accordingly, rotation of spindle 12 is transmitted to rotary gear 30 with a large reduction gear ratio.

Rotation of rotary gear 30 relative to tool holder 13 causes screw shaft 20 to move in the rightward direction, as viewed in FIG. 1, whereby slide piece 22 is moved radially outwardly through the wedging action of cam surface 21. Radial movement of slide piece 22 is transmitted through pin 29 to cutting tool 26 to thereby adjust the position of cutting blade 25 in the radial direction. In this manner, since the radial position of cutting blade 25 of cutting tool 26 is adjusted through a unit amount per single rotation of spindle 12, spindle 12 is rotated n revolutions, wherein n is an integer, depending upon the wear amount of tool 26 so as to compensate for the wear of tool 26.

In the above-described operation, the radial position of tool 26 is adjusted depending upon the wear amount of tool 26. However, the tool position compensating mechanism according to the present invention can also be used for the setting of tool 26, with the aid of the above-described bore diameter measuring function. That is, after tool 26 is roughly set on tool holder 13, a workpiece is machined by tool 26 at trial. Then, the diameter of the machined bore is measured by the bore diameter measuring device. The position of tool 26 is adjusted in accordance with the measured diameter of the machined bore. Consequently, automatic setting of tool 26 becomes possible.

Moreover, since reduction gear mechanism 17 is provided at the contact portion between shank 14 and shell 16, shell 16 can be easily replaced by another shell for boring operation of different bores.

Obviously, numerous modifications and variations of the present invention are possible in light of the above teachings. It is to be understood, therefore, that within the scope of the appended claims, the invention may be practiced otherwise than as specifically described herein.

What is claimed as new and desired to be secured by Letters Patent of the United States is:

1. A tool holder for use in connection with a machine tool comprising:

a shank receivable in a tool spindle rotatably supported in a spindle head of said machine tool;

a tool mounting shell securely connected to said shank and adjustably movably carrying a cutting tool in a radial direction of said mounting shell;

a screw shaft axially slidably but non-rotatably supported in said tool mounting shell and having a cam surface which is sloped along the axis of said tool mounting shell;

transmitting means interposed between said cutting tool and said cam surface of said screw shaft for adjustably moving said cutting tool in the radial direction by wedging action of said cam surface upon axial movement of said screw shaft;

a rotary member rotatably received and threadedly engaged with said screw shaft;

a ring shaped internal gear member rotatably supported on the external peripheries of said shank and said mounting shell adapted to be fixed relative to said spindle head for bringing about relative rotation between said internal gear member and said mounting shell upon rotation of said tool spindle; and reduction gear means for transmitting rotation of said mounting shell relative to said internal gear member to said rotary member at a predetermined reduction gear ratio, wherein said reduction gear means further comprises a rotatable planet gear engaged with said internal gear member.

2. A tool holder as set forth in claim 1, wherein said transmitting means further comprises:

a slide piece maintained in contact with said cam surface of screw shaft and guided to be moved in the radial direction of said mounting shell when said screw shaft is axially moved; and a pin guided by said tool mounting shell between said slide piece and said cutting tool for transmitting radial movement of said slide piece to said cutting tool.

3. A tool holder as set forth in claim 1, further comprising:

latch means provided between said internal gear member and one of said shank and mounting shell for preventing rotation of said internal gear member relative to said shank during cutting operation.

4. A tool holder as set forth in claim 1, 2 or 3, wherein said rotary member and said reduction gear means are received in a recess formed at the contact portion between said shank and said mounting shell.

5. A tool holder as set forth in claim 4, said rotary member having a gear portion, wherein said reduction gear means further comprises:

a stationary gear secured to said mounting shell in juxtaposed and co-axial relationship with said rotary member;

a ring-shaped transmission gear enclosing said rotary member and said stationary gear and engaged at the external periphery thereof with said planet gear; and a pair of pinion gears rotatably supported by said transmission gear and engaged with said stationary gear and said gear portion of said rotary member.

6. A tool holder as set forth in claim 5, further comprising a contact detecting head secured to one end of said mounting shell in co-axial alignment therewith for measurement of a machined bore of a workpiece.

* * * * *